United States Patent
Lundblad et al.

(10) Patent No.: US 9,401,522 B2
(45) Date of Patent: *Jul. 26, 2016

(54) FUEL CELL ASSEMBLY HAVING FEED-BACK SENSOR

(71) Applicant: myFC AB, Stockholm (SE)

(72) Inventors: Anders Lundblad, Stockholm (SE); Henrik Ekstrom, Stockholm (SE); Eric Jonsson, Grasmark (SE)

(73) Assignee: MYFC AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,662

(22) Filed: Oct. 20, 2014

(65) Prior Publication Data

US 2015/0037699 A1    Feb. 5, 2015

Related U.S. Application Data

(63) Continuation of application No. 12/674,491, filed as application No. PCT/SE2008/050932 on Aug. 20, 2008, now Pat. No. 8,889,307.

(30) Foreign Application Priority Data

Aug. 20, 2007  (SE) ........................ 0701883
Feb. 22, 2008  (SE) ........................ 0800424

(51) Int. Cl.
 *H01M 8/04*    (2016.01)
 *H01M 8/24*    (2016.01)
 *H01M 8/10*    (2016.01)

(52) U.S. Cl.
 CPC ...... *H01M 8/04753* (2013.01); *H01M 8/04089* (2013.01); *H01M 8/0494* (2013.01); *H01M 8/04223* (2013.01); *H01M 8/04552* (2013.01); *H01M 8/04559* (2013.01);

(Continued)

(58) Field of Classification Search
CPC combination set(s) only.
See application file for complete search history.

(56) References Cited

U.S. PATENT DOCUMENTS 5,170,124 A    12/1992  Blair et al.
5,472,580 A    12/1995  Kennard, III et al.

(Continued)

FOREIGN PATENT DOCUMENTS

EP    0827226 A2    3/1998
EP    1103807 A2    5/2001

(Continued)

OTHER PUBLICATIONS

International Search Report dated Dec. 10, 2008, from corresponding PCT application.

(Continued)

*Primary Examiner* — Ula C Ruddock
*Assistant Examiner* — Osei Amponsah
(74) *Attorney, Agent, or Firm* — Young & Thompson

(57) ABSTRACT

A sensor cell (1010) for control purposes usable in an assembly (1000) of fuel cells of the type having a membrane electrode assembly (MEA) interposed between an anode gas diffusion layer and a cathode gas diffusion layer, and first and second current collectors coupled to the anode and cathode gas diffusion layers (GDL), respectively. The sensor cell (1010) is preferably coupled so that it shares the negative current collector (1050) with last fuel cell in the in-plane fuel cell assembly (1000), and is short-circuited by a resistor (1070) to provide a voltage signal, indicative of the status of the assembly in operation.

20 Claims, 9 Drawing Sheets

(52) U.S. Cl.
CPC ..... *H01M 8/04567* (2013.01); *H01M 8/04798* (2013.01); *H01M 8/04955* (2013.01); *H01M 8/1097* (2013.01); *H01M 8/24* (2013.01); *H01M 8/241* (2013.01); *H01M 2008/1095* (2013.01); *H01M 2250/30* (2013.01); *Y02B 90/18* (2013.01); *Y02E 60/521* (2013.01)

(56) References Cited

U.S. PATENT DOCUMENTS

| | | | |
|---|---|---|---|
| 5,798,186 | A | 8/1998 | Fletcher et al. |
| 6,020,083 | A | 2/2000 | Breault et al. |
| 6,620,538 | B2 | 9/2003 | Bai et al. |
| 6,673,480 | B1 * | 1/2004 | Wilkinson et al. ............ 429/430 |
| 6,847,188 | B2 | 1/2005 | Keskula et al. |
| 6,893,756 | B2 | 5/2005 | Clingerman et al. |
| 6,913,845 | B2 | 7/2005 | Bekkedahl et al. |
| 6,977,121 | B2 * | 12/2005 | Balliet et al. ................. 429/427 |
| 7,498,150 | B2 | 3/2009 | Nelson et al. |
| 7,754,392 | B2 | 7/2010 | Miura |
| 2003/0198839 | A1 | 10/2003 | Bruck et al. |
| 2006/0275645 | A1 | 12/2006 | Gallagher et al. |
| 2007/0099058 | A1 | 5/2007 | Adams et al. |
| 2007/0134527 | A1 | 6/2007 | Desouza et al. |
| 2007/0218345 | A1 | 9/2007 | Sakai et al. |

FOREIGN PATENT DOCUMENTS

| | | |
|---|---|---|
| EP | 1571723 A1 | 9/2005 |
| JP | 60/54176 | 3/1985 |
| JP | 1988310573 A | 12/1988 |
| JP | 2002-270198 A | 9/2002 |
| JP | 2002280048 A | 9/2002 |
| JP | 2005203143 A | 7/2005 |
| JP | 2009504160 A | 2/2009 |
| WO | 00/02282 | 1/2000 |
| WO | 01/43216 | 6/2001 |
| WO | 0237594 A2 | 5/2002 |
| WO | 2004/091279 | 10/2004 |
| WO | 2006/041397 | 4/2006 |
| WO | WO2007/117212 | 10/2007 |
| WO | 2008032838 A1 | 3/2008 |

OTHER PUBLICATIONS

Japanese Office Action, dated Apr. 2, 2013, from corresponding JP application.

Extended European Search Report, dated Nov. 26, 2013, from corresponding EP application.

* cited by examiner

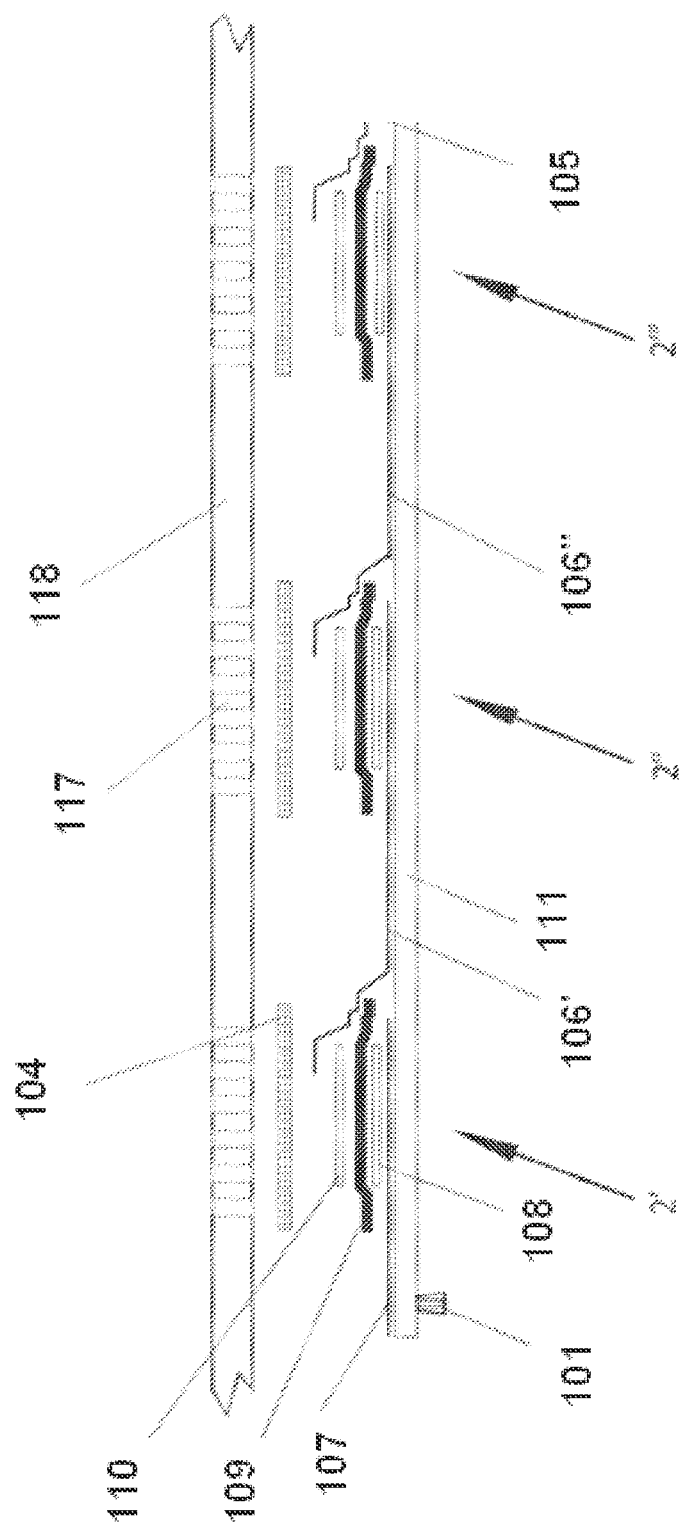

FUEL CELL ASSEMBLY HAVING FEED-BACK SENSOR

The present invention relates generally to electrochemical cells, and in particular fuel cells, wherein the fuel feed or the power draw is controlled by means of a sensor cell.

BACKGROUND OF THE INVENTION

The type of fuel cell that the present invention concerns is disclosed in International patent applications PCT SE2007/050222 and in PCT SE2005/001514.

Fuel cells of this type typically consist of the following design features/functionalities:

1) A sealing functionality creating the anode gas chamber. This is accomplished by using an adhesive which thereby seals the Membrane Electrode Assembly (MEA) to an anode current collector foil.

2) A gas distribution functionality to distribute the hydrogen gas to different cells in a fuel cell device. This is accomplished by forming a support plate with gas channels for the hydrogen gas. The fuel cells are attached to the support plate by adhesive and/or clamping means. From the support plate there are holes leading to the anode gas chamber of each cell.

3) An electrical interconnect functionality which collects the current from one cell and distributes it to the adjacent cell, preferably with minimal resistance and in such a manner that uniform current density is obtained over the active area of the cells.

4) A clamping feature. By subjecting the fuel cell to a clamping force the internal resistance within the cell is decreased, i.e. contact resistances between different materials and specific resistances inside materials (e.g. by compressing the Gas Diffusion Layer (GDL) its fiber-fiber connections improves). Analogous to the electrical contact also the heat conductivity is improved by the clamping and thereby more heat can be dissipated from the reaction layers (i.e. the electrodes). The clamping feature is closely linked to the electrical interconnect functionality.

All these design features/functionalities applied together form a fuel cell device.

A general problem with fuel cell assemblies (fuel cell devices) is that fuel feed is not always optimal (i.e. constant and corresponding to the power demand of a device being powered by the fuel cell power source) and therefore one has to control either the fuel feed (hydrogen gas flow) to or the power draw from the fuel cell device.

Often times, fuel cell stack performance is monitored by detecting the voltage of individual cells or groups of cells in the stack. A typical stack generally comprises 30 to 200 individual cells. Voltage detection of individual cells or groups of cells is expensive and requires a complex data acquisition system and control algorithm to detect and identify a voltage condition outside a preset voltage range and to take corrective action or shut down the stack until normal operating conditions (i.e. conditions within a desired or preferable range) can be restored. A typical approach to monitoring fuel cell performance using voltage detection is described in U.S. Pat. No. 5,170,124. This patent describes an apparatus and method for measuring and comparing the voltages of groups of cells in a fuel cell stack to a reference voltage.

If the measured and reference voltages differ by more than a predetermined amount, an alarm signal or process control procedures can be initiated to implement a shut-down sequence or commence remedial action. While this voltage detection approach identifies the existence of an out-of-bounds condition, the approach is imprecise as to the source and/or nature of the problem which triggered the out-of-bounds condition.

In WO 00/02282 (Ballard Power Systems) there is disclosed an electrochemical fuel cell stack includes a plurality of fuel cells. At least one of the fuel cells is a sensor cell. The sensor cell has at least one structural dissimilarity with respect to the remaining fuel cells of the plurality. The structural dissimilarity may include, for example, a reduced sensor cell electrochemically active area, reduced electrocatalyst loading, modified anode or cathode flow field, different electrocatalyst composition, or a modified coolant flow field configuration. The sensor cell operates under substantially the same conditions as the remaining cells in the stack. However, in response to a change in a particular stack operating condition, an electrical or thermal response, preferably a voltage change, is induced in the sensor cell which is not simultaneously induced in the remaining fuel cells. Thus, the sensor cell can detect undesirable conditions and its response can be used to initiate corrective action. More than one sensor cell, specific to different types of conditions, may be employed in the stack. In the absence of undesirable conditions, the sensor cell can function as a power-producing fuel cell.

According to '282 sensor cells incorporated in a stack can also serve as useful power-producing cells. Thus, during operation of the stack to produce electrical power the sensor cell(s) and the remaining cells are connected to provide electrical power. A variable electrical load may be applied across the fuel cell stack comprising the sensor cell(s). Sensor cells according to '282 are connected in series in the stack.

SUMMARY OF THE INVENTION

The object of the present invention is to provide improved control in that the fuel feed matches the power draw, or vice versa, of one or several in-plane fuel cell assemblies.

This object is achieved by the invention as defined in claim 1.

Thus, by providing a separate, smaller fuel cell at the outlet of the in-plane fuel cell assembly, said smaller cell being driven by fuel that has passed through the assembly without being consumed, thereby generating an electric signal, a feed-back to the fuel supply can be provided, thereby controlling the fuel feed or alternatively the power draw of the fuel cell assembly, and consequently an optimization of fuel consumption is enabled. Thus, the additional cell functions as a sensor cell.

Preferably the sensor cell is electrically coupled so that it shares the negative current collector with the last fuel cell in the in-plane fuel cell assembly. By using the sensor cell, it will become possible to identify a state of malfunction of the assembly (i.e. lack of hydrogen).

An advantage of providing a dedicated, smaller sensor cell instead of using the last cell in an assembly for control purposes is that the smaller sensor cell will have a more uniform gas concentration (which yields a more uniform electrochemical potential) than a larger last cell of an assembly. This will provide for a longer service life of the design. Furthermore, air will not enter into the last cell as easily, where it could cause corrosive conditions. Also, the sensor cell can provide information on whether there is too much or too little gas supplied to the assembly. If the last ordinary cell in the assembly is used as sensor, it can only provide information of a too small gas supply. Finally, the sensor cell can ascertain that all gas is consumed provided that the sensor cell is big enough.

In addition to the above the sensor cell of the present invention is very cheap to produce.

The invention will now be described with reference to the appended drawing figures. The figures are only schematic illustrations and not drawn to scale. A reference in the description to "upper" or "lower" shall be interpreted as the orientation in the figure, bearing in mind the a fuel cell can have any orientation in use.

BRIEF DESCRIPTION OF THE DRAWINGS

FIG. 1 illustrates a prior art fuel cell device;

DETAILED DESCRIPTION OF THE INVENTION AND PREFERRED EMBODIMENTS THEREOF

Figure 2A:
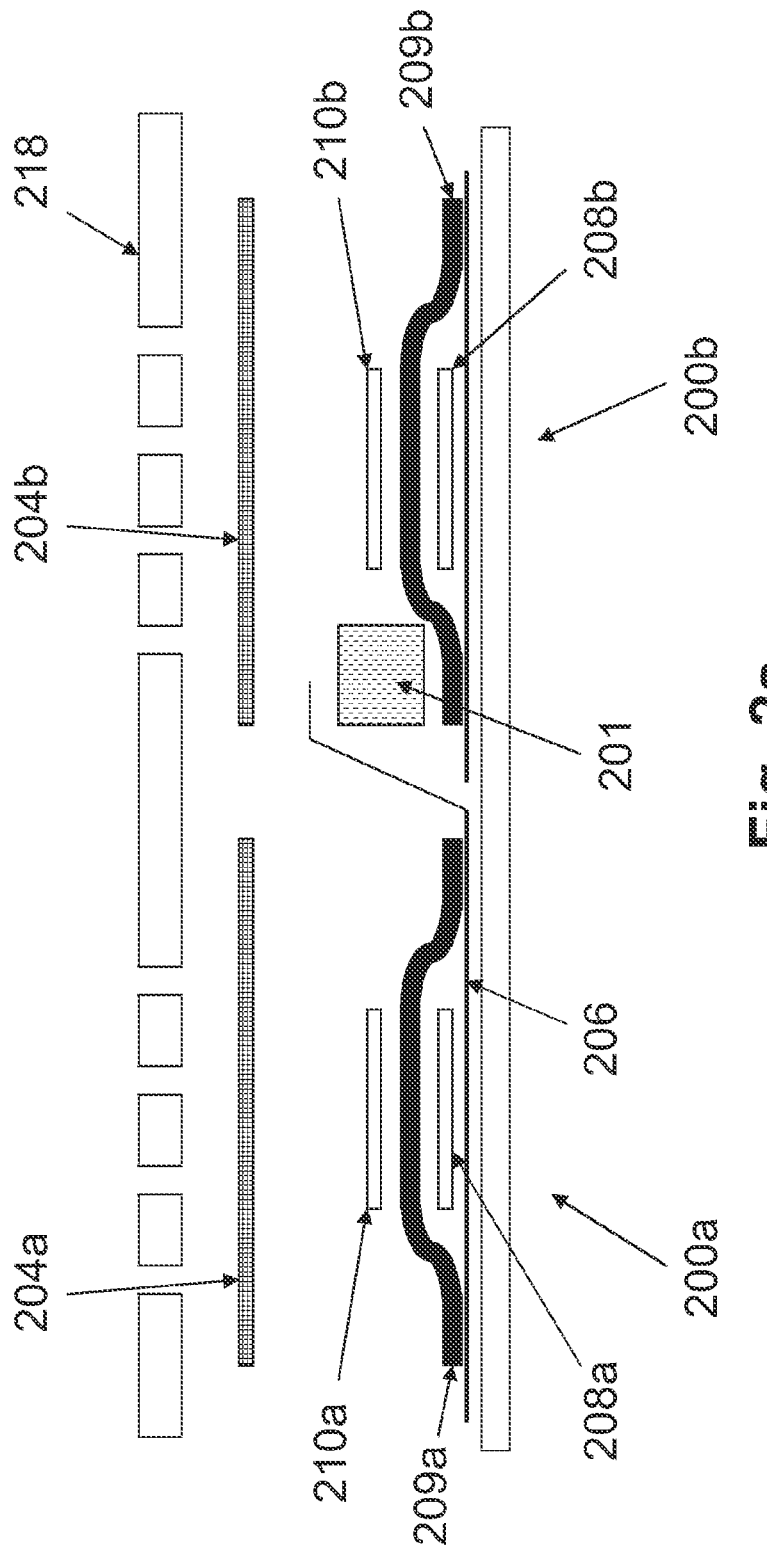
FIG. 2a illustrates another prior art fuel cell usable with the invention.

FIG. 1 shows an example of a prior art fuel cell device. It comprises a plurality of fuel cells interconnected in series (three cells shown). The stack is provided on a support plate 111, on which all cells are mounted. Each cell comprises an anode GDL 108 and a cathode GDL 110, between which a MEA 109 is interposed. Electrical interconnection between cells is obtained by means of a current collector foil 106' which is connected to the anode GDL 108 of one cell and to the cathode GDL 110 of an adjacent cell, and thus functions as an anode current collector at one end, and as a cathode current collector at the other end. Thus, the foil is provided at the bottom of one cell assembly (in the middle in the figure) on the support plate 111, it extends out from that cell assembly and is further extended to rest partly on the MEA of the adjacent cell (to the left in the figure), and ends in contact with the cathode GDL 110 of the adjacent cell.

On top of each cell there is provided an inert, air pervious clamping member 104, which can be a gold plated metal net or perforated steel plate. Finally, a top plate 118 is provided over the entire array of cells to keep the components tightly together and to decrease inner resistances.

As can be clearly seen in FIG. 1, the current collector foil 105, 106', 106" will be in contact, at least partially, with the MEA 109. During operation of the cell this contact can lead to electrochemical reactions occurring between the MEA and the foil. These reactions will in fact cause corrosion of the foil, whereby ions will be released, and the ions will subsequently poison the MEA, thereby causing a shortened effective life of the cell assembly. This is especially true for the cathode side where water is formed and high electrochemical potentials.

For the anode side the conductive adhesive is working as a protective layer hindering the corrosion.

In order to eliminate the harmful corrosion/poisoning, there can be provided an improvement in the design, namely that provisions are made for preventing the current collector foil from one cell from coming in contact with the cathode side of the MEA and the cathode GDL of an adjacent cell to which it is connected.

The expression "clamping means" includes one or several components which compress the fuel cell and uniformly distributes the current to the fuel cell. The clamping means can have an air pervious component which is inert and exhibits a high electrical conductivity, e.g. a gold plated stainless steel net or a gold plated plate/foil having apertures for gas permeation.

By this arrangement of the current collector foil, the electrical current is transferred to the cathode of the adjacent cell. The advantage of this design is that the conductive foil component (including conducting adhesive) only needs to be electrochemically inert under anode conditions. This is because only the clamping means are in contact with the cathode side of the MEA and the cathode GDL of an adjacent cell.

Generally there can be provided an arrangement for interconnecting electrochemical cells of the type having a membrane electrode assembly (MEA) interposed between an anode gas diffusion layer and a cathode gas diffusion layer, and first and second current collectors coupled to said anode and cathode gas diffusion layers (GDL), respectively, wherein the current collectors can be conductive foils, graphite structures or the like, extending from the anode side of one cell to the cathode side of an adjacent cell, and wherein the cell components are clamped together.

Suitably, an insulating element is interposed between the anode current collector of the first cell and the cathode side of the second, adjacent cell, wherein electrical connection is provided by said inert conductive member.

A fuel cell assembly embodying the above features will now be described with reference to FIG. 2a.

Two cells 200a and 200b, respectively, connected in series are shown. Each comprises an anode GDL 208a and 208b, a cathode GDL 210a and 210b, a MEA 209a and 209b, and an inert conductive clamping element 204a and 204b, respectively.

A conductive foil 206 is provided beneath the anode part of the first cell 200a (to the left) and extends out to the right for connection to the second, adjacent cell 200b. The foil can be made of metal, graphite, or any other suitable material that can be shaped as required. The term "conductive foil" shall be taken to encompass a copper tape with electrically conductive adhesive, or a tin (Sn) coated copper foil with or without an electrically conductive adhesive. It may also be a thin carbon based material such as, but not limited to, a graphite foil made from thermally expanded graphite, a carbon fibre cloth, a carbon paper material, a combination of the above listed materials. It could also be any other electrically conductive foil material, as long as its structural performance meets the requirements set by the environment in the cell.

In this embodiment, an insulating spacer member 201 is interposed between the anode conductive foil 206 (extending from under the anode side of one cell 200a, to the left in the figure) and the MEA 209b of the adjacent cell, so that the electrical connection to the clamping means component 204b (e.g. a gold plated net) of an adjacent cell 200b is ensured, while at the same time ensuring that the foil 206 is electrochemically insulated from the MEA 209b of the adjacent cell 200b, when the top plate 218 is put in place under pressure. Thus, the first current collector 206 has an extended portion which is in contact with the upper surface of said spacer member 201 when clamped by said inert conductive member 204b against the spacer member 201.

The positioning of this electrical connection should preferably be selected such that condensed water cannot form an electrochemical cell between the current collector foil and the MEA. Such an electrochemical cell could serve as a passage for ions being released in a corrosion process.

However, if other measures are taken so that the formation of an electrochemical cell between the anode foil 206 and the cathode of an adjacent cell can be avoided, then the positioning of the electrical connection will be less critical. E.g. by hydrophobising the surface of the spacer member material or introducing some other barrier for liquid film formation the water will not so easily diffuse to undesired spots in the cell environment.

Figure 2B:
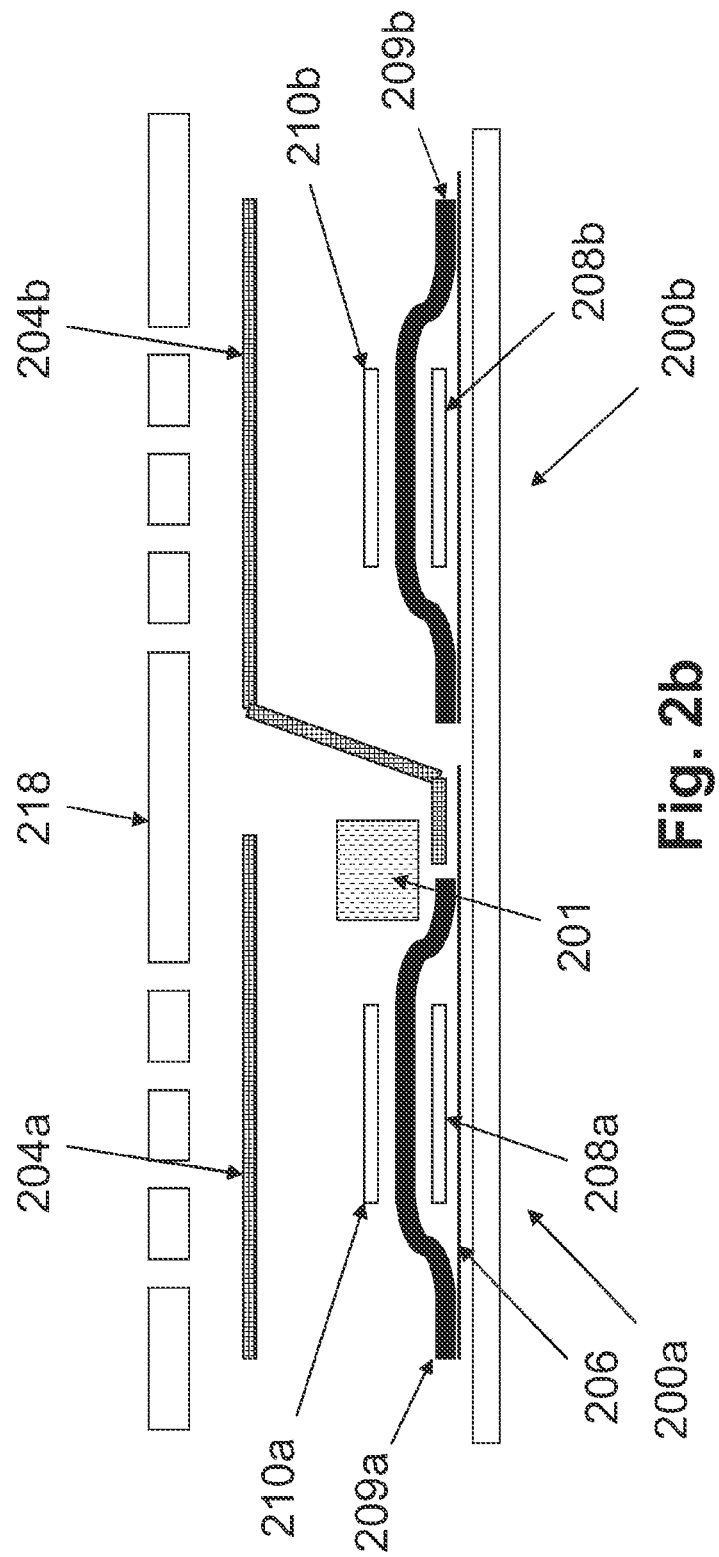
FIG. 2b illustrates another prior art fuel cell usable with the invention.

In another embodiment, illustrated in FIG. 2b, the clamping means component 204b (e.g. gold plated net or graphite member) of one of the cells (the one to the right in the figure) is bent downwards at an angle such that it extends away from the cell assembly and does not come into contact with the MEA of the same cell, to contact the current collector foil 206 of the adjacent cell (the one to the left in the figure). An insulating spacer member 201 is placed on the clamping means component (i.e. the net) and is pressed down by the top plate 218, thereby electrically connecting the net 204b to the current collector 206.

Thus, in this embodiment the bottom surface of the spacer member is in contact with a portion of the membrane electrode assembly (MEA) of said first cell 200a, and the inert conductive member 204b is clamped between the bottom surface of said spacer member 201 and the current collector 206.

Here the inert conductive member 204b extends from the bottom of the spacer member 201 upwards and into contact with the cathode GDL 210b of the adjacent cell 200b.

The clamping means component 204 can also have a mechanical integrity so that when being shaped in accordance with FIG. 2b, the spring force of the clamping means component ensures the electrical contact.

Said spacer member 201 is preferably a compressible cushion, and should preferably be made of a porous plastic material which is inert in the fuel cell environment. Preferably, the material or the surface of the material should also be hydrophobic so that liquid film formation of condensed water can be avoided. Examples of suitable materials for the spacer member are porous tetrafluoroetene (PTFE) or similar hydrophobic materials, porous silicon rubber or another compressible and inert plastic material. If the material is not hydrophobic in itself, it should preferably be coated with a hydrophobic material such as PTFE.

The spacer member 201 can also be non-compressible but this sets higher demands on dimensioning the cushion correctly and/or that more compressible GDL materials are selected for the components 208 and 210. In such case it could be made from nonporous PTFE or silicon.

Figure 3:
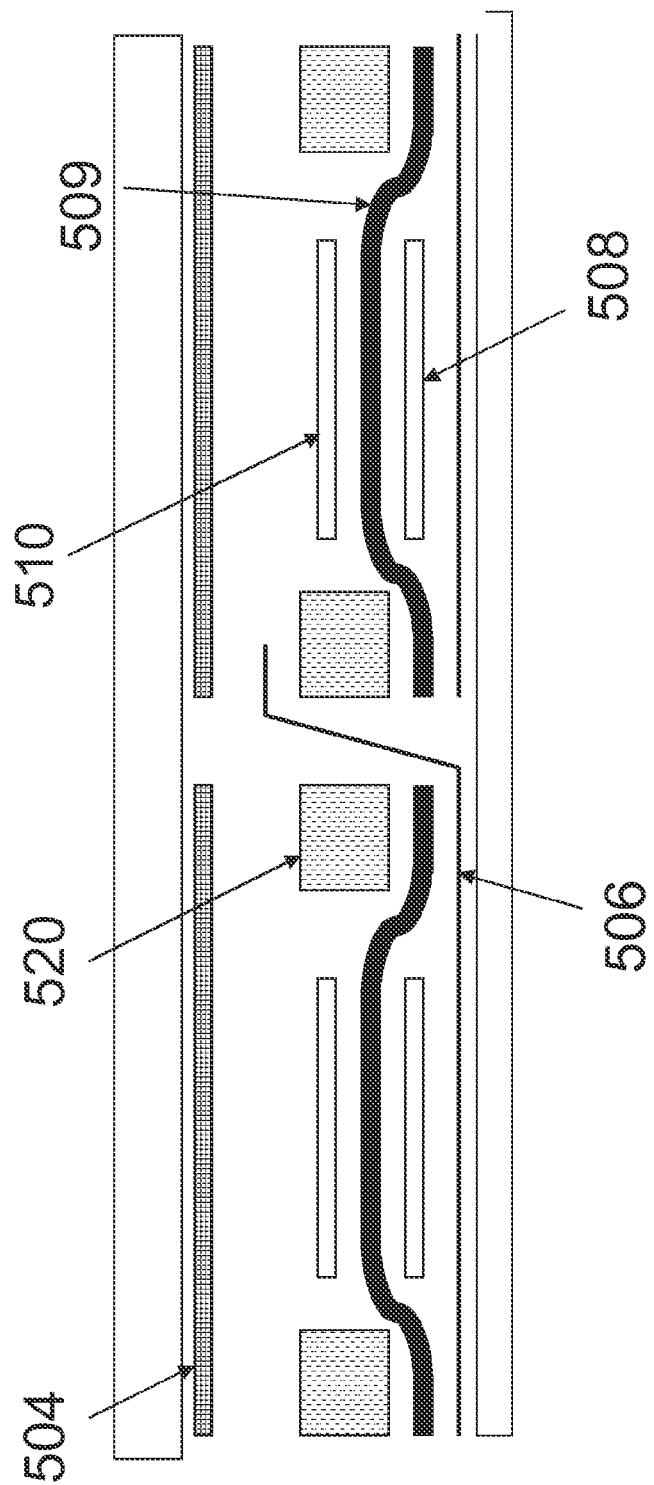
FIG. 3 schematically illustrated a further embodiment.

In FIG. 3 there is schematically illustrated a further embodiment. A fuel cell assembly comprises a plurality (two shown) of fuel cells each comprising an anode GDL 508 and a cathode GDL 510 separated by a MEA 509, all elements provided on a support plate. A current collector 506 extends across the anode side of a cell and of to one side thereof, and is further folded upwards and placed on top of the spacer frame 520 of the adjacent cell, and in contact with the clamping member 504. A spacer member is provided in the form of a frame 520 of e.g. Poron®, said frame being provided so as to clamp the MEA and the foil 506.

Now the present invention will be describe in more detail.

Thus, according to the invention there is provided for a control function for the cell performance, by the introduction of a sensor cell. This concept is schematically illustrated in FIGS. 4a and b, and will now be described in detail.

Figure 4A:
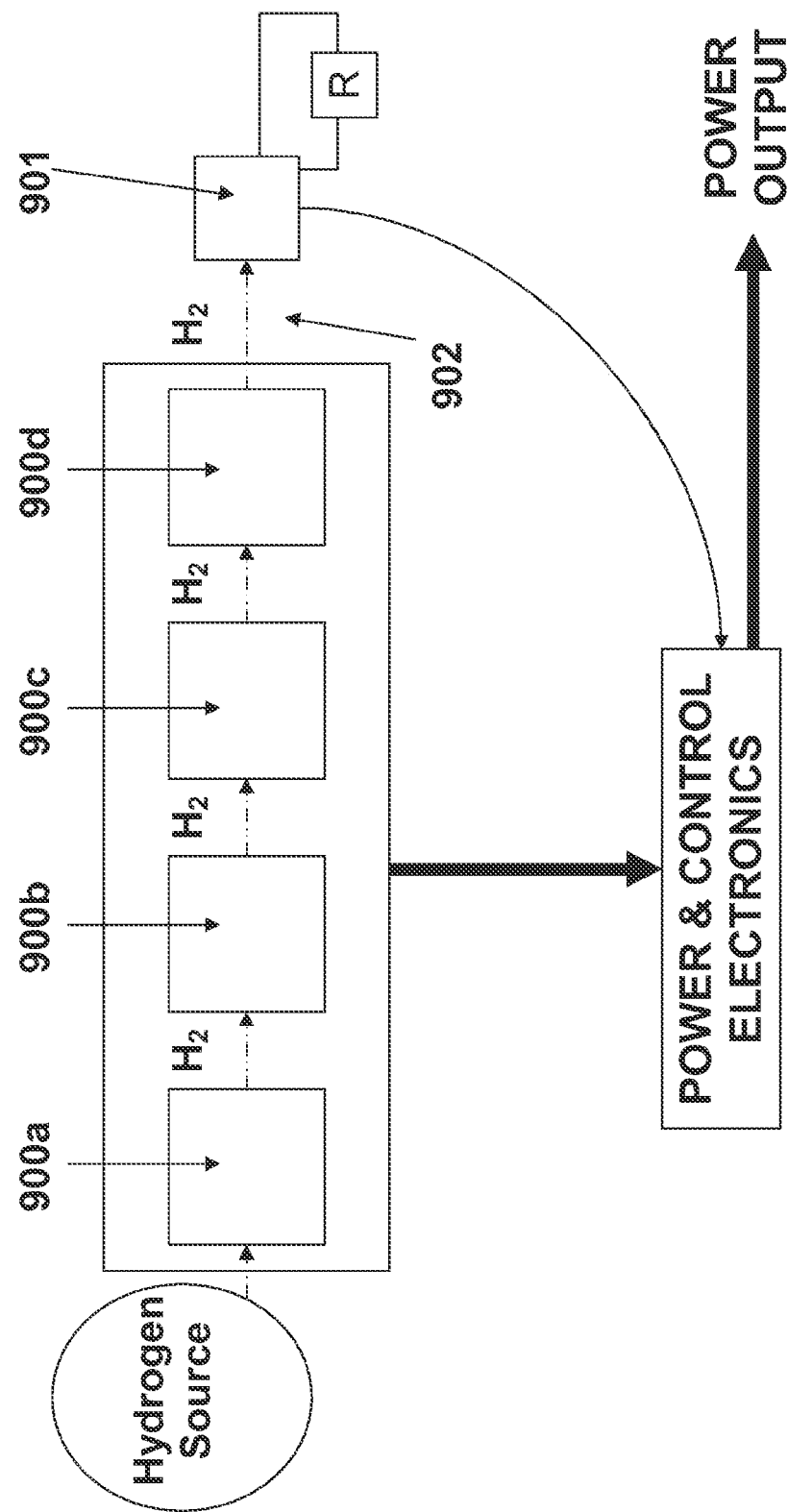
FIG. 4a shows schematically the lay-out of a multiple cell device connected in series with respect to fuel feed, and having a sensor cell according to the invention for control purposes.
Figure 4B:
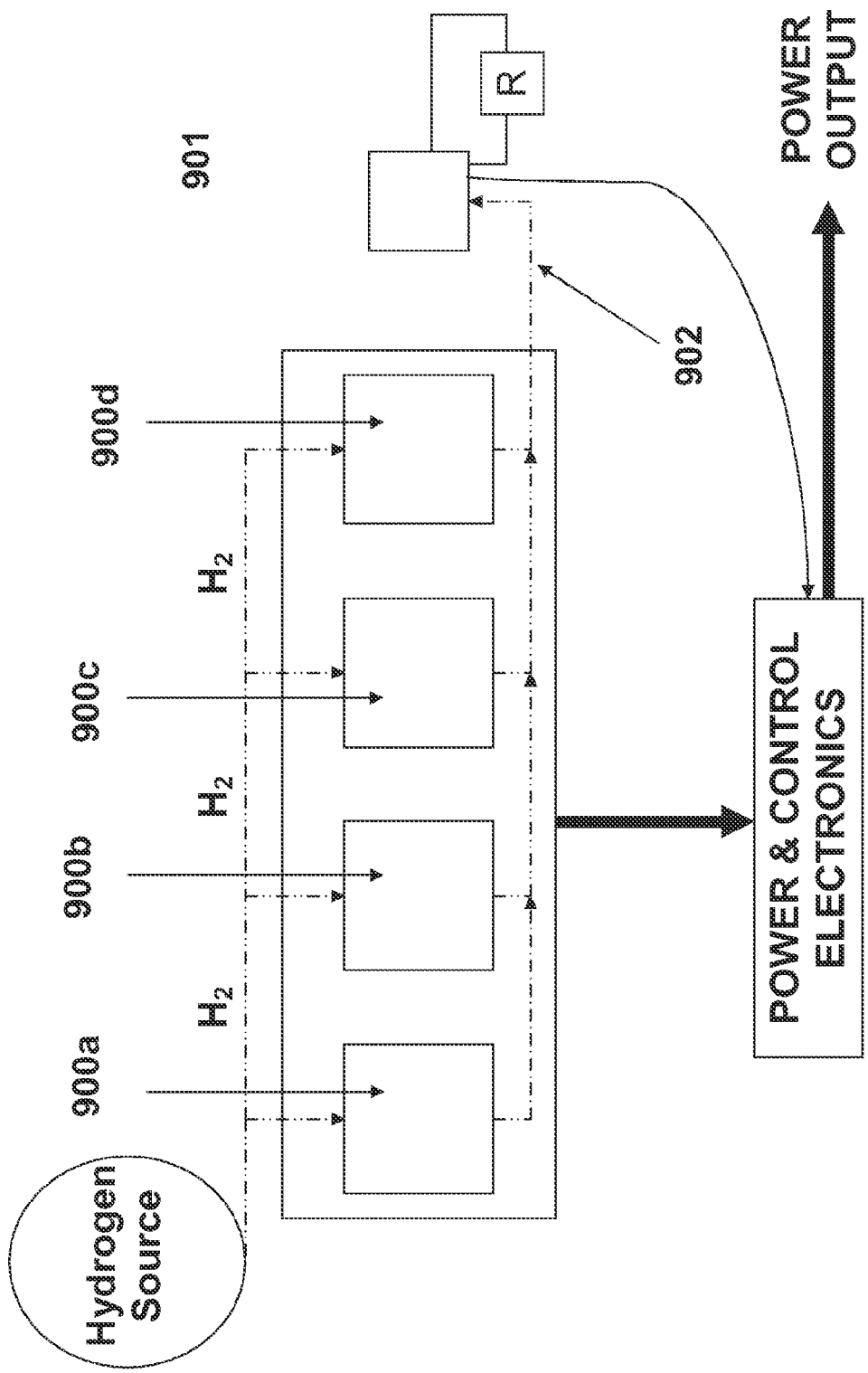
FIG. 4b shows schematically the lay-out of a multiple cell device connected in parallel with respect to fuel feed, and having a sensor cell according to the invention for control purposes.

Thus, in a multiple cell 900a-d arrangement shown in FIG. 4a, a smaller sensor cell 901 is included in the design. The cells 900a-d, 901 may be connected in series (as shown in FIG. 4a) or connected in parallel with respect to the hydrogen supply (as shown in FIG. 4b). Series connection is preferable since in parallel mode failure of one cell in the assembly may not be detected, which however will be possible in series connection. However, in a multiple sensor arrangement the sensor cell can be placed both in series and in parallel with respect to the hydrogen fuel supply (fuel feed).

The construction and fabrication of this sensor cell can in principle follow the design of the other cells. However, the sensor cell is electrically connected so that it shares the negative current collector with last fuel cell in the in-plane fuel cell assembly. This is achieved by letting the anode current collector extending from the last operative or power cell, extend further on the support plate, and to place the sensor cell on the current collector with its anode GDL in contact with it.

Series gas connection has the advantage that a droplet of condensed gas water can easily be purged out of the fuel cell assembly and the risk of said droplet stopping the gas flow is small. The disadvantage advantage of a series connected fuel feed is that the pressure gradient over the fuel cell device may lead to different performance of the first and the last cell.

The disadvantage of the parallel connected fuel feed is that it might be difficult for a small pressure gradient to push a condensed droplet through a gas channel. Furthermore if the flow channel of a cell is blocked the lack of hydrogen in this cell is not detected by the sensor cell, because hydrogen gas can flow through other channels.

The anode and the cathode of the sensor cell are connected with each other via a resistor R. The resistance of this said resistor is set to a specific value so that a suitable current (e.g. 100 mA) can pass through the cell. A suitable range is wherein the resistor has a resistance of 0.5-2 Ohms, preferably 0.75-1.25 Ohms. The placement of this cell is at the hydrogen gas outlet 902 from the other cells. The purpose of the sensor cell 901 is to indicate that all cells 900a-d are provided with sufficient hydrogen. When there is adequate hydrogen through the set-up, the sensor cell will provide a voltage which is higher than a certain value. When there is little or no hydrogen gas in the system, the voltage will drop below the said value and of course down to zero V if no hydrogen gas is available. If the voltage exceeds the set limit, this will indicate that the hydrogen supply rate is too high.

In order to avoid corrosion problems for the sensor cell the working potential (working voltage) must not be too high. When having the sensor cell short circuited over a resistor the working voltage should be between 0.1 and 0.4 V. Thus the resistor should be matched so that the cell voltage at unlimited hydrogen supply is between 0.1 and 0.5 V, preferably 0.1 to 0.3 V.

The size of the sensor cell can be chosen from the following criteria: 1) Stability in the regulation. The smaller the sensor cell is the more sensitive it becomes (larger voltage jumps) when there are changes in the load/gasflow. 2) Fuel economy. The larger the sensor cell, the more hydrogen is combusted in the sensor cell.

Example of procedure for dimensioning of the sensor cell size and the resistor. 1) Choose the desired stoichiometry (e.g. 5% excess gas). Calculate the corresponding current (e.g. for a 4-cell unit with a nominal current of 1 A this becomes 0.05*4*1=200 mA=Ireg). 2) Choose a sensor cell active area size which at steady-state can deliver approximately 2*Ireg=400 mA at 0.3 V. For the design of the present invention with a Gore MEA (PRIMEA 5710) the sensor cell size should be around 0.8 cm2. 3) Choose a resistor R so that R=0.15 V/Ireg=0.15/0.2=0.75 Ohm.

The excess gas consumed by the sensor cell can be less for a larger fuel cell assembly. Preferably the excess gas fraction should be 1-5%.

Figure 5:
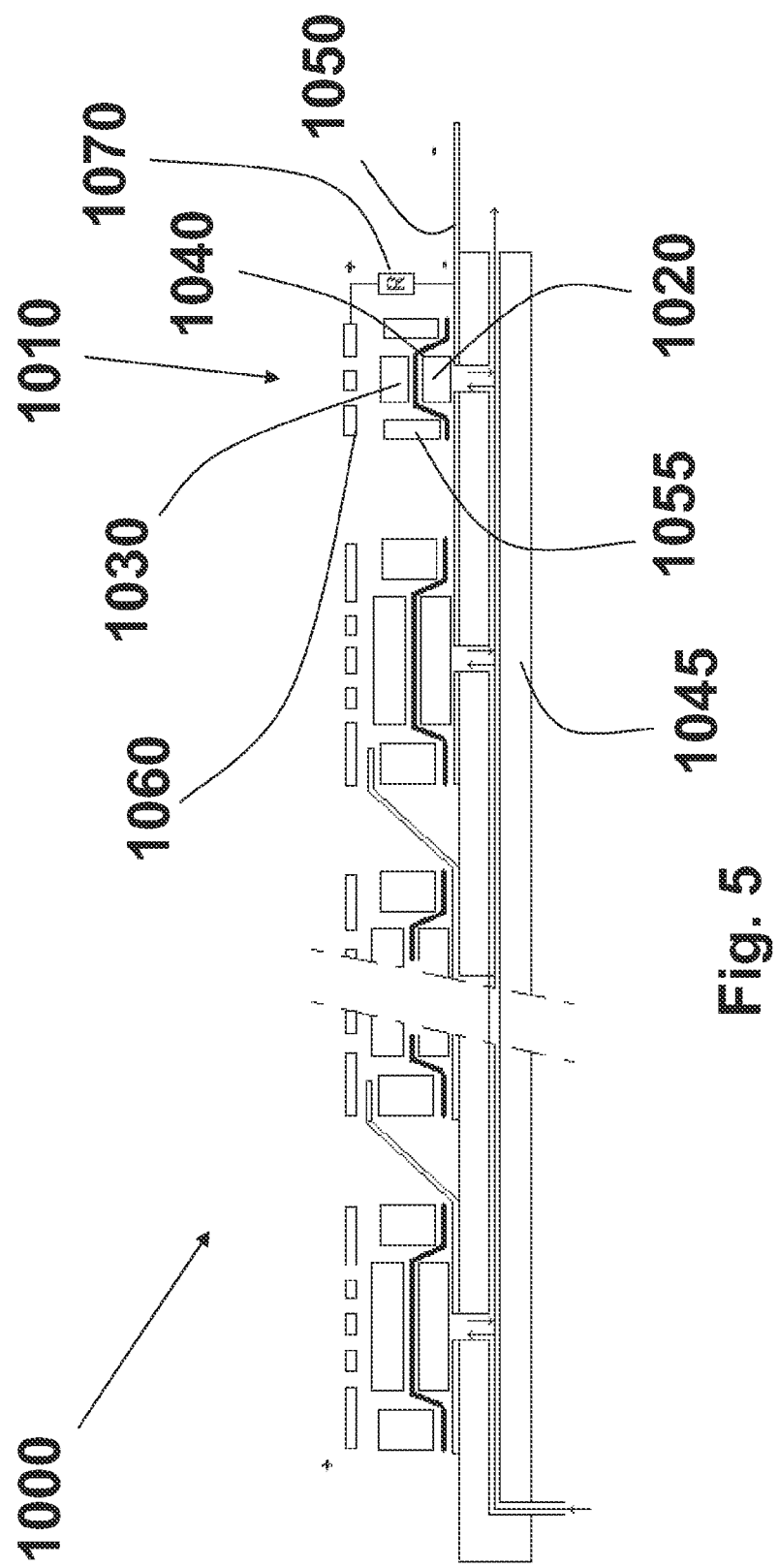
FIG. 5 is a schematic cross-section of a four cell assembly incorporating a sensor cell according to the invention.

FIG. 5 illustrates schematically but in more detail a fuel cell assembly generally designated 1000 with a sensor cell 1010 according to the invention provided at the outlet of the assembly. The cells in the assembly shown are connected in series with respect to the fuel feed direction, which is the preferred embodiment.

The sensor cell 1010 has in principle the same constitution as the operating effect cells in the assembly, i.e. as described with reference to FIG. 5b and will not be further described here.

Thus, the sensor cell comprises an anode GDL 1020, a cathode GDL 1030, a MEA 1040 separating the GDLs, all elements provided on the same support plate 1045 as the other power generating cells in the assembly, a current collector 1050, e.g. a conductive foil or an element made of graphite, provided on the support plate, a spacer frame 1055 arranged to clamp the MEA 1040 to the support plate and to seal off the GDL/MEA/GDL stack, and on top the clamping plate 1060. The spacer member is particularly important for the sensor cell when it is being used in a pressurized system (i.e. in order to help the sealing of the cell). The current collector 1050 extends across the anode side of the sensor cell and extends so as to be connected to the negative pole of the adjacent power generating cell, i.e. the last cell in the assembly.

The sensor cell is short-circuited by a resistor 1070. The voltage across this resistor is continuously measured and provides a voltage signal indicative of the fuel consumption in the assembly.

Thus, if the voltage across the resistor drops to zero, this is an indication that the fuel cell assembly is not being provided enough fuel, and thus the rate of fuel supply can be increased. On the contrary, if the voltage increases and reaches a set threshold, this indicates that the fuel supply is too high and can be adjusted to a lower rate. This provides for an efficient fuel control, thereby optimizing the performance of the cell assembly.

The sensor cell can be applied in open-end systems, where there is an open outlet from the sensor cell to the ambient air. However, preferably, the outlet should be a thin capillary so that the back diffusion of air into the sensor cell is not too rapid.

When in use, the voltage signal from the sensor cell can be utilized in two different ways:

The voltage signal is provided to the hydrogen source system (hydrogen generator system) so that more or less hydrogen gas is fed into the multiple fuel cell array, depending on the amount of hydrogen gas needed for the fuel cells to work.

Another alternative is to provide the signal to the power electronics of the fuel cell unit. This voltage signal can be used to set the output power of the fuel cell unit. If the voltage signal drops then the power must be decreased. This above-mentioned power electronics hence needs to have a functionality that controls the output power from the fuel cell unit.

DEFINITIONS

Fuel cell assembly=fuel cell device=multiple fuel cell array: Includes one or several series connected fuel cells and a sensor cell.

Fuel cell power source: may comprise fuel cartridge/hydrogen generator, fuel cell, valves, power and control electronics, battery and/or supercapacitor.

Fuel cell Sticker: replaceable component in a fuel cell assembly comprising MEAs, GDLs, current collector foils, and plastic materials.

In-plane fuel cell assembly: A fuel cell device where the individual cells are placed next to each other on a surface (planar or bent or even with kinks)

Open-ended fuel cell device: fuel cell device with no particular valve or gas flow restrictor at the gas exit of the device.

Dead-end fuel cell device: fuel-cell device with an on/off valve placed after the fuel cells.

Dead-end fuel cell device with bleed: fuel cell device with a gas flow restrictor placed after the fuel cells.

Open-Ended Fuel Cell Device

The fuel feed can be controlled by an electronically controlled strangler valve (or several on/off valves being placed in parallel) which can alter the gas flow up and down. Alternatively, in the case of in-situ production of hydrogen by e.g. hydrolysis, the reaction rate can be controlled. If the subsequent fuel cell is open-ended the sensor cell can give feedback to the valve or to the reactor so that the fuel feed is accurate for the current draw (i.e. corresponding to the required power draw).

Another option is to run the fuel cell device open-ended without any particular control of the fuel feed (i.e. the hydrogen flow). This is the case e.g. when having a metal hydride tank connected to the fuel cell device via a pressure reduction valve and a flow restrictor or when having a hydrolysis reactor with a passive control of the reaction rate. For this option the power draw of the fuel cell has to be adjusted to the fuel feed. If said power draw is larger than what is needed externally (e.g. by a mobile phone being powered/charged by the fuel cell power source), then the extra power generated can charge the internal battery of the fuel cell power source. Vice versa the battery can add on power if the external power need is higher than what the fuel cell can supply (e.g. due to low hydrogen flow).

Dead-End Fuel Cell Device

If the fuel cell device is supplied with a pressurized gas, (i.e. the fuel feed is designed to reach a certain pressure, when not exceeding its max-flow limit). In this system there is an on/off valve (dead-end valve) at the gas outlet of the fuel cell device. Said valve should be opened for purging out air during start-up of the fuel cell device and also when running due to accumulation of non-fuel gases (e.g. water vapor and $N_2$). By placing a sensor cell after the fuel cells in the gas flow direction but before the dead end valve, the sensor cell can be used during start-up to determine when the concentration of hydrogen has reached acceptable level and thus the dead-end valve can be closed. When running the fuel cell the sensor cell can determine when the concentration of hydrogen has decreased to low and purging is required.

Dead-End Fuel Cell Device with Bleed

Another option is to have a dead-end valve (in practice any type of valve) with a small leakage, a bleed (this can be a simple gas flow constriction). With the bleed the accumulation of non-fuel gases can be avoided. Another advantage of the "bleed" design is that the sensor cell can indicate when the power draw is larger than what the max-flow limit can support (i.e. if the fuel consumption is larger than what the fuel source can supply), because then a vacuum will be created in the last power generating fuel cell and air will be sucked in to the sensor cell through the gas flow constriction.

One advantageous design is when the dead-end valve with bleed has a pressure dependent functionality so that it opens at a threshold value (typically 1-7 psi; 6.9 kPa-48.3 kPa). If a valve of this kind (e.g. threshold 3 $P_o/4$) is connected to fuel cell device with a gas flow channel system that provides a suitable gas flow restriction (e.g. at nominal power the pressure drop over the fuel cell assembly is 30-60% of that of the inlet pressure, the pressure of the hydrogen source, $P_o$), then the following start-up and run algorithm can be followed:

1) Startup: when hydrogen gas is connected to the fuel cell then the pressure will increase above 3 $P_o/4$ and the valve will open leading to purging out of air from the fuel cell assembly. As soon as the sensor cell voltage becomes high the fuel cell power draw is started leading to that the pressure decreases at the dead-end valve below 3 $P_o/4$, which thus closes again.
2) Running: When running the fuel cell device the sensor cell voltage may become low due to lack of hydrogen. The first measure is to decrease the power draw from the fuel cell device (if the power draw is higher than the corresponding max-flow limit of the hydrogen source). The second measure, if sensor cell voltage has not increased enough, is to momentarily stop the power draw from fuel cell device. The pressure at the dead-end valve will then increase above 3 $P_o/4$ and the fuel cell device will be purged.

Larger Systems

Figure 6:
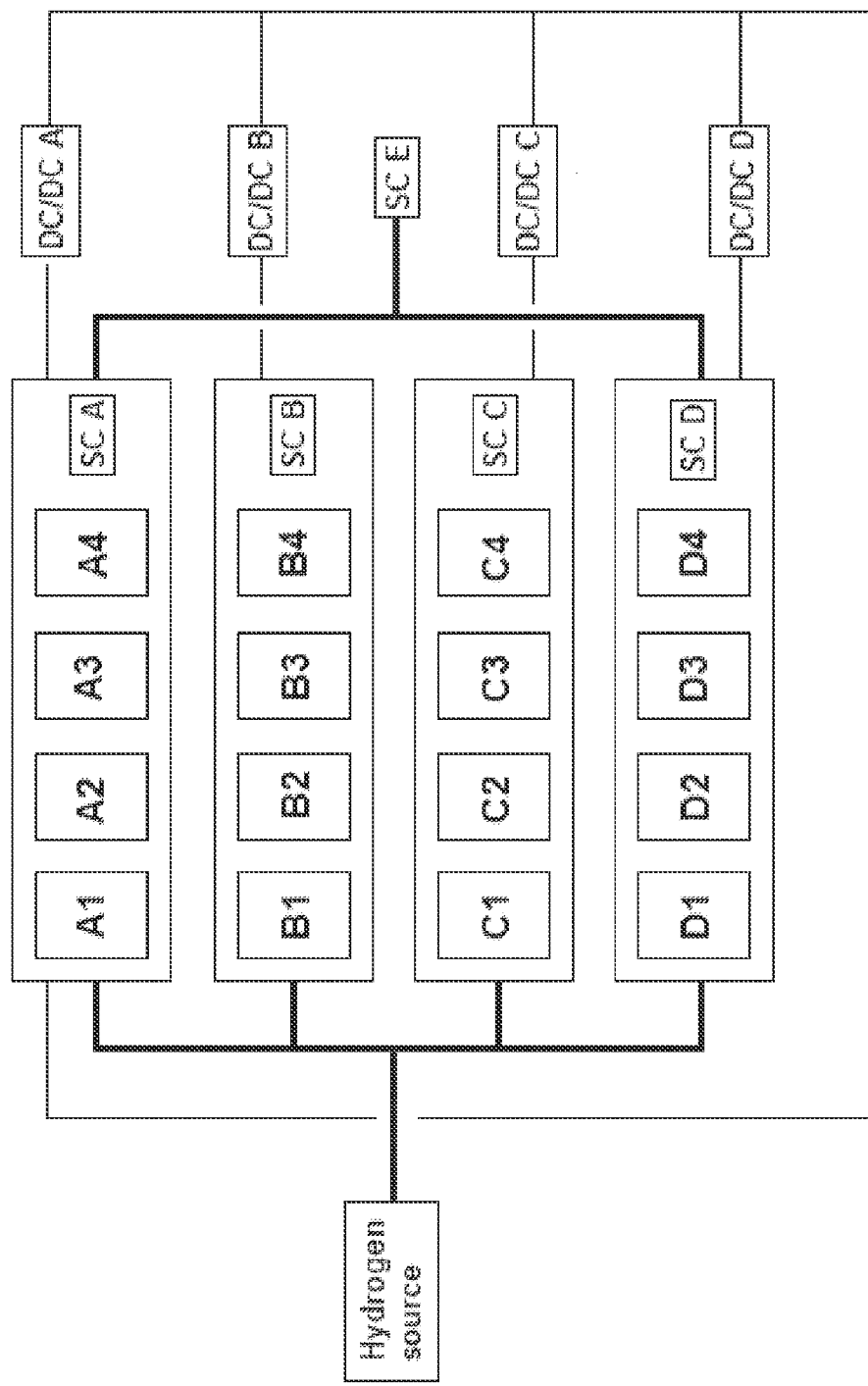
FIG. 6 shows a "large system" comprising 4 fuel cell assemblies, each provided with a sensor cell in accordance with the present invention.

The sensor cell can also be used in multiple unit systems. Typically these systems comprise several fuel cell units (each of 3-8 cells) connected in parallel with respect to gas flow and electrical current, each unit having one sensor cell. Connected to each fuel cell is also a DC/DC-converter and also power control electronics. A system of this type is schematically illustrated in FIG. 6.

In this system the DC/DC convertors are increasing the voltage from the working voltage of the fuel cell unit to the output voltage (Vout). Using the signal from the sensor cells each power control unit controls the output power so that all hydrogen gas is consumed, irrespective if the flow is different in to the different fuel cell units.

The last sensor cell (SC E) can be used as an alarm and also as an after burner if hydrogen is escaping from the other sensor cells.

The sensor cell can be implemented for control purposes in a number of different devices. One example is a charger for e.g. mobile phones, as schematic illustration of which is shown in FIG. 7.

Figure 7:
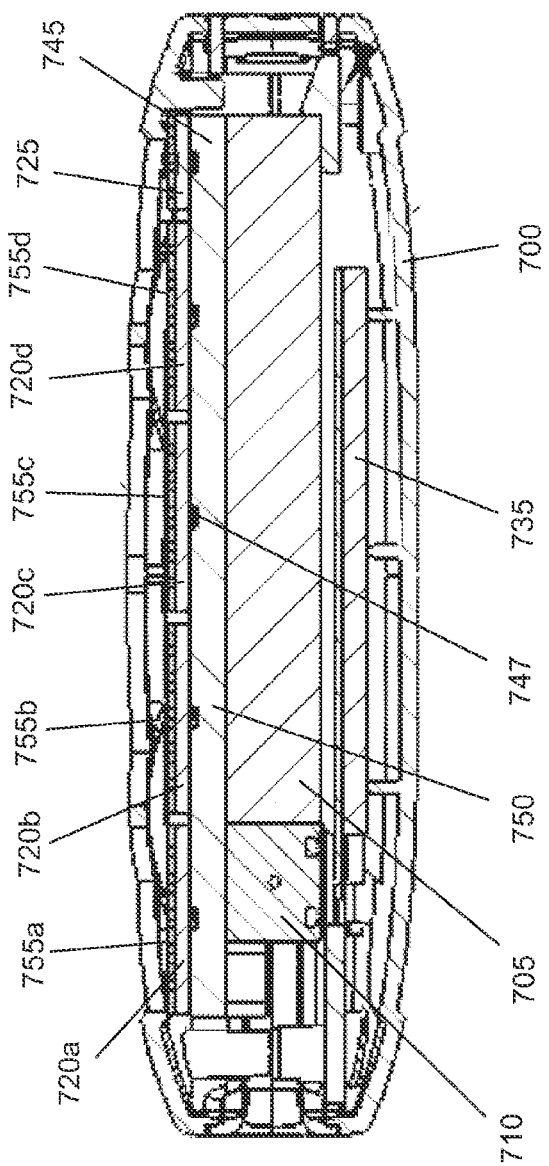
FIG. 7 is a cross section of a fuel cell power source for e.g. a mobile phone comprising a fuel cell assembly and a sensor cell according to the invention.

Thus, the mobile phone charger shown in FIG. 7 comprises a plastic casing 700, a metal hydride hydrogen canister (MH tank) 705, a gas connector device 710, a gas flow restrictor (not shown), a fuel cell sticker 750 comprising four in-plane fuel cells 720*a-d*, a sensor cell 725, electronics (not specifically shown), a battery 735, and a USB A female connector (not shown). The gas flow restrictor (not shown) restricts the gas flow to a certain level, which may or may not be independent of the inlet pressure. The fuel cell also comprises a support plate 745 with channels 747 grooved in the surface facing the fuel cell sticker 750 for the hydrogen gas distribution, a fuel cell sticker of four cells, and a clamping means 755 made of gold plated perforated steel plates. For the sensor cell 725 the support plate 745 and the fuel cell sticker 750 are extended so that the negative current collector foil of the last cell (gas flow direction) is used as the negative electrode of the sensor cell. The electronics consist of a first DC/DC converter to reach a suitable voltage for charging the battery and a second DC/DC converter to reach the required 5 V of the USB connector. The electronics also monitors the voltage of the sensor cell 725 and of the individual cells; it also monitors the temperature levels of the fuel cell and of the battery. The electronics controls the power from the fuel cell by regulating the output voltage from the first DC/DC converter. The battery is a Li-ion battery.

The dimensions and active area of the sensor cell is 2.1×0.4 cm=0.84 cm2. The sensor cell is short-circuited over a resistor of 1 Ohm.

The invention will now be further illustrated by way of the following non-limiting Examples.

Example 1

Sensor Cell

This example describes the results obtained when controlling either the gas flow or the current level with the use of an additional fuel cell (a sensor cell) fed with hydrogen from the hydrogen exhaust at the end of a four cell fuel cell unit as described in Example 2.

The sensor cell was made in the same way as the other four cells in the in-plane cell assembly, with identical MEA and GDLs used. However, this cell was of smaller dimensions than the other four cells with a total active area of 1 cm². It comprised the same clamping techniques, using a gold net, as also described in Example 2.

This cell was not electrically connected to the other four cells, but short-circuited over a resistor with a known resistance of 1 Ohm, the voltage over the resistor thus being directly proportional to the current flowing through the sensor cell. By continuously controlling the voltage over the resistor, using a PID controller, by varying either the current through the fuel cell unit or the hydrogen gas flow, this fifth cell now enables us to ensure that enough hydrogen is fed through the fuel cell unit at all times to support the hydrogen consumption due to the current drawn.

Here the results are shown for a four cell unit, as described in Example 2, with an additional sensor cell as described above, when increasing the current in 5 s steps from 0.2 A down to 1 A. The PID-controller was programmed to keep the voltage level over the fifth cell to 0.2 V by varying the gas flow. As can be seen this controlling strategy is able to smoothly follow a ramp in current.

| Time/s | Current/A | $H_2$ flow/ml min$^{-1}$ |
| --- | --- | --- |
| 5 | 0.200 | 6.074 |
| 10 | 0.213 | 6.813 |
| 15 | 0.227 | 6.561 |
| 20 | 0.240 | 6.963 |
| 25 | 0.253 | 7.454 |
| 30 | 0.267 | 7.962 |
| 35 | 0.280 | 8.463 |
| 40 | 0.293 | 8.389 |
| 45 | 0.307 | 9.515 |
| 50 | 0.320 | 9.538 |
| 55 | 0.333 | 9.996 |
| 60 | 0.347 | 10.486 |
| 65 | 0.360 | 10.417 |
| 70 | 0.373 | 10.926 |
| 75 | 0.387 | 11.330 |
| 80 | 0.400 | 11.350 |
| 85 | 0.413 | 11.679 |
| 90 | 0.427 | 12.156 |
| 95 | 0.440 | 12.648 |
| 100 | 0.453 | 12.810 |
| 105 | 0.467 | 13.139 |
| 110 | 0.480 | 13.605 |
| 115 | 0.493 | 13.741 |
| 120 | 0.507 | 14.862 |

| Time/s | Current/A | H$_2$ flow/ml min$^{-1}$ |
|---|---|---|
| 125 | 0.520 | 14.899 |
| 130 | 0.533 | 15.050 |
| 135 | 0.547 | 15.925 |
| 140 | 0.560 | 15.903 |
| 145 | 0.573 | 16.896 |
| 150 | 0.587 | 16.621 |
| 155 | 0.600 | 16.347 |
| 160 | 0.613 | 17.037 |
| 165 | 0.627 | 17.852 |
| 170 | 0.640 | 17.516 |
| 175 | 0.653 | 18.548 |
| 180 | 0.667 | 18.966 |
| 185 | 0.680 | 18.963 |
| 190 | 0.693 | 19.473 |
| 195 | 0.707 | 20.206 |
| 200 | 0.720 | 19.462 |
| 205 | 0.733 | 20.485 |
| 210 | 0.747 | 20.925 |
| 215 | 0.760 | 20.827 |
| 220 | 0.773 | 21.367 |
| 225 | 0.787 | 22.716 |
| 230 | 0.800 | 23.174 |
| 235 | 0.800 | 22.558 |
| 240 | 0.800 | 22.732 |
| 245 | 0.800 | 22.667 |
| 250 | 0.800 | 22.072 |
| 255 | 0.800 | 23.040 |
| 260 | 0.800 | 22.584 |
| 265 | 0.800 | 22.827 |
| 270 | 0.800 | 22.453 |
| 275 | 0.800 | 22.381 |
| 280 | 0.800 | 22.445 |
| 285 | 0.800 | 23.045 |
| 290 | 0.800 | 22.600 |
| 295 | 0.800 | 22.772 |
| 300 | 0.800 | 22.975 |

By instead programming the PID-controller to keep the voltage level over the fifth cell at 0.2 V by varying the current level, with a maximum allowed current level trough the fuel cell unit of 1 A, one obtains the following results when the same fuel cell unit is exposed to variations in gas flow (here controlled manually by a valve):

| Time/s | Current/A | Gas flow setting |
|---|---|---|
| 5 | 0.000 | zero gas flow |
| 10 | 0.000 | |
| 15 | 0.000 | |
| 20 | 0.309 | The gas flow increased to a very high value >10 ml/min per cell |
| 25 | 0.496 | |
| 30 | 0.690 | |
| 35 | 0.929 | |
| 40 | 0.997 | |
| 45 | 0.987 | |
| 50 | 0.957 | |
| 55 | 1.000 | |
| 60 | 0.913 | |
| 65 | 0.017 | Lowering the gas flow slightly, ca 5 ml/min per cell |
| 70 | 0.435 | |
| 75 | 0.579 | |
| 80 | 0.794 | |
| 85 | 0.690 | |
| 90 | 0.674 | |
| 95 | 0.670 | |
| 100 | 0.686 | |
| 105 | 0.713 | |
| 110 | 0.661 | |
| 115 | 0.668 | |
| 120 | 0.709 | |
| 125 | 0.713 | |
| 130 | 0.210 | Gas flow lowered further, ca 2 ml/min per cell |
| 135 | 0.237 | |
| 140 | 0.234 | |
| 145 | 0.236 | |
| 150 | 0.221 | |
| 155 | 0.249 | |
| 160 | 0.189 | |
| 165 | 0.222 | |
| 170 | 0.228 | |
| 175 | 0.229 | |
| 180 | 0.172 | |
| 185 | 0.000 | Gas flow set to zero again |
| 190 | 0.000 | |
| 195 | 0.000 | |

Example 2

Charger Comprising Sensor Cell

This is an example to describe a mobile phone charger or a general purpose electricity providing device, which is using a fuel cell and a sensor cell as described earlier in this patent application.

The charger consists of a plastic casing, a metal hydride hydrogen canister (MH tank), a gas connector device, a gas flow restrictor, a fuel cell, a sensor cell, electronics, a battery, and a USB A connector (female). The gas flow restrictor restricts the gas flow to a certain level, which may or may not be independent of the inlet pressure. The fuel cell consists of a support plate with channels grooved in the surface facing the fuel cell sticker for the hydrogen gas distribution, a fuel cell sticker of four cells, and a clamping means made of gold plated perforated steel plates. For the sensor cell the support plate and the fuel cell sticker are extended so that the negative current collector foil of the last cell (gas flow direction) is used as the negative electrode of the sensor cell. The electronics consist of a first DC/DC converter to reach a suitable voltage for charging the battery and a second DC/DC converter to reach the required 5 V of the USB connector. The electronics also monitors the voltage of the sensor cell and of the individual cells; it also monitors the temperature levels of the fuel cell and of the battery. The electronics controls the power from the fuel cell by regulating the output voltage from the first DC/DC converter. The battery is a Li-ion battery.

The power output of the charger is 1-3 W. The power of the fuel cell is 0.5-2.5 W depending on the hydrogen gas flow and the performance of the fuel cell. This is thus a hybrid system where the battery is adding power when the fuel cell cannot fulfill the power need of the device being powered/charged. Alternatively when the power of the fuel cell exceeds that of the device being powered/charged then the battery is capable of storing that extra energy.

The gas flow which depends on the pressure of the metal hydride hydrogen (MH) canister, the pressure reduction valve of the gas connector device, and the gas flow restrictor, is between 15 and 35 ml/min. Thus, the flow of hydrogen gas into the fuel cell is not varied but is set by the pressure levels and the flow restrictor.

The dimensions and active area of the sensor cell is 2.1×0.4 cm=0.84 cm2. The sensor cell is short-circuited over a resistor of 1 Ohm.

Operating the Fuel Cell (Steady Operation)

The voltage of the sensor cell should (when running the fuel cell) always be 0.2 V. If the voltage is lower than 0.2 V this indicates a lack of hydrogen and thus the control electronics will decrease the voltage from the first DC/DC-controller and less current will be charged into the Li-ion battery and/or the second DC/DC convertor. If the voltage is higher than 0.2 V the opposite mechanism will take place. The electronic control is using a PVM-regulation.

Start-Up

When starting up the system the cells of fuel cell are consecutively and individually short circuited for a time period of 1 second per cell. Between each short circuiting the voltage of the sensor cell is tested. This procedure is intended for initiating the cells before starting the steady operation.

Shut Down

In the event of error indication the MH tank is disconnected from the gas connector device by an electromechanical mechanism and a light diode is indicating that the charger is entering a shut down procedure. Such error indication can be 1) low voltage of one particular cell (i.e. below 0.3 V), 2) too low voltage of the sensor cell (i.e. below 0.1 V), 3) too high current coming from the fuel cell (i.e. exceeding 1.5 A), 4) too high temperature at the fuel cell (i.e. higher than 50 degrees celcius, 5) too high or too low temperature at the battery (i.e. below 5 or above 45 degrees celcius), 6) too high or too low voltage at the battery (i.e. below 3.6 or above 3.9 V).

This error indication will also occur when the MH tank is taken out deliberately.

During shut down the first cell of the fuel cell is shortcircuited for 0.2 sec and then waiting for 0.2 sec. This procedure is repeated until the voltage of the first cell is less than 0.8 V.

The invention claimed is:

1. A fuel cell assembly, comprising:
   a gas feed;
   a support plate;
   a negative current collector; and
   a plurality of fuel cells arranged in an in-plane configuration on the support plate, the plurality of fuel cells comprising at least one power generating fuel cell and a sensor fuel cell,
   wherein the plurality of fuel cells are connected to the gas feed,
   wherein a last power generating fuel cell includes a hydrogen gas outlet providing residual fuel therefrom,
   wherein a portion of the negative current collector extends between the last power generating fuel cell and the hydrogen sensor,
   wherein said sensor fuel cell comprises a GDL/MEA/GDL stack made up of an anode GDL, a cathode GDL, and a MEA interposed between said anode and cathode GDLs,
   wherein said sensor fuel cell is located at the hydrogen gas outlet of the last power generating fuel cell so as to receive fuel from the residual fuel provided from said hydrogen gas outlet, and
   wherein said sensor fuel cell is coupled to electrically share the portion of the negative current collector, that extends between the last power generating fuel cell and the sensor fuel cell, with said last power generating fuel cell; and
   a resistor (R) connecting the anode and the cathode of the sensor fuel cell, wherein said sensor fuel cell has a voltage.

2. The fuel cell assembly as claimed in claim 1, wherein all elements of the sensor fuel cell are provided on the support plate and all elements of the power generating fuel cell(s) are provided on the support plate.

3. The fuel cell assembly as claimed in claim 1, wherein the sensor fuel cell is coupled in series with the power generating fuel cell(s) with respect to a supply of hydrogen.

4. The fuel cell assembly as claimed in claim 1, further comprising a hydrogen supply, wherein,
   the assembly includes a plurality of the power generating fuel cells arranged in the in-plane configuration on the support plate,
   all elements of the sensor fuel cell are provided on the support plate and all elements of the power generating fuel cells are provided on the support plate, and
   the sensor fuel cell is coupled in series with the power generating fuel cells with respect to the supply of the hydrogen.

5. The fuel cell assembly as claimed in claim 1, wherein,
   the gas feed provides a hydrogen supply,
   the hydrogen supply has a max-flow limit, and
   the sensor fuel cell is configured to indicate when a power draw is larger than the max-flow limit of the hydrogen supply.

6. The fuel cell assembly as claimed in claim 1, adapted to consume 1-5% of the gas feed.

7. The fuel cell assembly as claimed in claim 1, wherein the resistor is dimensioned as follows for a sensor fuel cell having a working voltage of Uwork:

$$R = U\text{work}/I\text{reg}/$$

wherein $$I\text{reg} = E\text{gas} \times I\text{nom} \times N$$

and

Egas is excess gas supplied to the sensor fuel cell, Ireg is a current through the sensor fuel cell for an assembly of N cells having a nominal current of Inom.

8. The fuel cell assembly as claimed in claim 1, wherein the resistor has a resistance of 0.5-2 Ohms.

9. The fuel cell assembly as claimed in claim 1, wherein the resistor has a resistance of 0.75-1.25 Ohms.

10. The fuel cell assembly as claimed claim 1, wherein the sensor fuel cell is smaller than the power generating fuel cell(s).

11. The fuel cell assembly as claimed claim 1, wherein the negative current collector extends from the last power generating fuel cell further on the support plate to the sensor fuel cell, and both the last fuel cell and the sensor fuel cell are located on said negative current collector with both the anode GDL of the sensor fuel cell and an anode GDL of the last fuel cell in contact with the negative current collector.

12. The fuel cell assembly as claimed in claim 1, further comprising a control unit operatively connected to the plurality of fuel cells and adapted to regulate the supply of hydrogen to the assembly in response to the voltage of the sensor fuel cell.

13. The fuel cell assembly as claimed in claim 1, further comprising a control unit operatively connected to the plurality of fuel cells and adapted to regulate a power draw from the assembly in response to the voltage of the sensor fuel cell.

14. The fuel cell assembly as claimed in claim 1, further comprising a spacer frame that clamps the MEA to the support plate and seals off the GDL/MEA/GDL stack.

15. The fuel cell assembly as claimed in claim 1 connected to an electrical device.

16. The fuel cell assembly as claimed in claim 1 connected to an electronic apparatus, wherein the fuel cell assembly is a power source for the electronic apparatus.

17. A fuel cell assembly, comprising:
a hydrogen feed with a max-flow limit;
a support plate;
a negative current collector; and
a plurality of fuel cells arranged in an in-plane configuration on the support plate and connected to the hydrogen feed, the plurality of fuel cells comprising plural series-connected power generating fuel cells and a sensor fuel cell,
wherein a last of the power generating fuel cells includes a hydrogen outlet providing residual fuel therefrom,
wherein a portion of the negative current collector extends between the last power generating fuel cell and the hydrogen sensor,
wherein said sensor fuel cell comprises a GDL/MEA/GDL stack made up of an anode GDL, a cathode GDL, and a MEA interposed between said anode and cathode GDLs,
wherein said sensor fuel cell is located at the hydrogen outlet of the last power generating fuel cell and receives fuel from the residual fuel provided from said hydrogen outlet, and
wherein said sensor fuel cell is coupled to electrically share the portion of the negative current collector, that extends between the last power generating fuel cell and the sensor fuel cell, with said last power generating fuel cell; and
a resistor (R) having a resistance of 0.5-2 Ohms and connecting the anode and the cathode of the sensor fuel cell, wherein said sensor fuel cell has a voltage,
wherein the sensor fuel cell is configured to indicate when a power draw is larger than the max-flow limit of the hydrogen source; and
a control unit operatively connected to the plurality of fuel cells and adapted to regulate at least one of the group consisting of i) the supply of hydrogen to the assembly in response to the voltage of the sensor fuel cell, and ii) a power draw from the assembly in response to the voltage of the sensor fuel cell,
wherein the plurality of fuel cells are connected to an electronic apparatus as a power source for the electronic apparatus.

18. The fuel cell assembly as claimed claim 17, wherein the sensor fuel cell is smaller than the power generating fuel cell(s).

19. A fuel cell assembly, comprising:
a hydrogen feed with a max-flow limit;
a support plate;
a negative current collector; and
a plurality of fuel cells arranged in an in-plane configuration on the support plate and connected to the hydrogen feed, the plurality of fuel cells comprising plural power generating fuel cells and a sensor fuel cell;
wherein a last of the power generating fuel cells includes a hydrogen outlet providing residual fuel therefrom,
wherein a portion of the negative current collector extends between the last power generating fuel cell and the hydrogen sensor,
wherein said sensor fuel cell receives fuel from the residual fuel provided from said hydrogen outlet,
wherein said sensor fuel cell comprises a GDL/MEA/GDL stack made up of an anode GDL, a cathode GDL, and a MEA interposed between said anode and cathode GDLs;
a negative current collector that extends from the last power generating fuel cell further on the support plate with the anode GDL of the sensor fuel cell in contact with the negative current collector, said sensor fuel cell being coupled to electrically share the portion of the negative current collector, that extends between the last power generating fuel cell and the sensor fuel cell, with said last power generating fuel cell; and
a resistor (R) having a resistance of 0.5-2 Ohms and connecting the anode and the cathode of the sensor fuel cell, wherein said sensor fuel cell has a voltage,
wherein the sensor fuel cell is configured to indicate when a power draw is larger than the max-flow limit of the hydrogen source; and
a control unit operatively connected to the plurality of fuel cells and adapted to regulate at least one of the group consisting of i) the supply of hydrogen to the assembly in response to the voltage of the sensor fuel cell, and ii) a power draw from the assembly in response to the voltage of the sensor fuel cell,
wherein the plurality of fuel cells are connected to an electronic apparatus as a power source for the electronic apparatus.

20. The fuel cell assembly as claimed claim 19, wherein the sensor fuel cell is smaller than the power generating fuel cell(s).

* * * * *